(12) United States Patent
Beach et al.

(10) Patent No.: US 10,395,640 B1
(45) Date of Patent: Aug. 27, 2019

(54) SYSTEMS AND METHODS EVALUATING USER AUDIO PROFILES FOR CONTINUOUS SPEECH RECOGNITION

(71) Applicant: nVoq Incorporated, Boulder, CO (US)

(72) Inventors: Richard Beach, Boulder, CO (US); Peter Fox, Boulder, CO (US); Charles Corfield, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 0 days.

(21) Appl. No.: 14/803,979

(22) Filed: Jul. 20, 2015

Related U.S. Application Data

(60) Provisional application No. 62/028,144, filed on Jul. 23, 2014.

(51) Int. Cl.
| | |
|---|---|
| *G10L 15/00* | (2013.01) |
| *G10L 15/01* | (2013.01) |
| *G10L 15/26* | (2006.01) |
| *G10L 15/06* | (2013.01) |
| *G10L 15/10* | (2006.01) |
| *G10L 15/07* | (2013.01) |
| *G10L 15/02* | (2006.01) |
| *G10L 15/187* | (2013.01) |

(52) U.S. Cl.
CPC ............ *G10L 15/01* (2013.01); *G10L 15/063* (2013.01); *G10L 15/26* (2013.01); *G10L 15/02* (2013.01); *G10L 15/07* (2013.01); *G10L 15/10* (2013.01); *G10L 15/187* (2013.01)

(58) Field of Classification Search
CPC ............................ G10L 15/261; G10L 15/265
See application file for complete search history.

(56) References Cited

U.S. PATENT DOCUMENTS

| | | | | |
|---|---|---|---|---|
| 7,689,416 | B1* | 3/2010 | Poirier | G10L 15/07 704/231 |
| 8,069,044 | B1* | 11/2011 | Moorer | G06F 17/30681 704/231 |
| 2005/0239022 | A1* | 10/2005 | Harless | G10L 15/26 434/167 |
| 2009/0171660 | A1* | 7/2009 | Jian | G10L 17/20 704/246 |
| 2011/0077933 | A1* | 3/2011 | Miyamoto | G06F 17/289 704/2 |
| 2013/0218575 | A1* | 8/2013 | Konishi | G10L 25/60 704/275 |

* cited by examiner

*Primary Examiner* — Vu B Hang
(74) *Attorney, Agent, or Firm* — Perkins Coie LLP

(57) ABSTRACT

To attain the advantages and in accordance with the purpose of the technology of the present application, apparatuses, systems, and methods to evaluate a user audio profile are provided. The evaluation of a user audio profile allows for identification of potential causes of poor performing user audio profiles and potential types of remediation to increase the performance of the user audio profile.

19 Claims, 10 Drawing Sheets

SYSTEMS AND METHODS EVALUATING USER AUDIO PROFILES FOR CONTINUOUS SPEECH RECOGNITION

CLAIM OF PRIORITY UNDER 35 U.S.C. §§ 119 AND 120

The present application claims priority to U.S. Provisional Patent Application Ser. No. 62/028,144, filed Jul. 23, 2014, the disclosure of which is incorporated herein as if set out in full.

Reference to Co-Pending Applications for Patent

None.

BACKGROUND

Field

The technology of the present application relates generally to speech recognition systems, and more particular, to apparatuses and methods for evaluating user audio profiles used to generate text in continuous speech recognition.

Background

Speech recognition engines today are migrating to more robust free, form continuous or natural language speech recognition. The focus of natural language systems is to match the utterance to a likely vocabulary and phraseology, and determine how likely the sequence of language symbols would appear in speech. Continuous speech recognition engines return sequences of words which are the best fit for the audio. In one exemplary continuous speech recognition, for a given sequence of words, the fit is a combination of two scores (or probabilities): one score indicates how well the phonemes for the words match the supplied audio; and the other is the likelihood of that sequence (of words) given the supplied language model (hereinafter "language model" or "LM"). Similar sounding sequences of words will have similar phonemic scores (how well their phonemes match the audio). However, the same similar sounding sequences may have quite different likelihoods when scored by the language model.

Continuous speech recognition has a user audio profile component (sometimes generically referred to as profile, user profile, or audio profile) that facilitates the speech recognition engine's determination of how well the phonemes for a sequence of words fits the audio. The continuous speech recognition engines in use today generally have adopted the Hidden Markov Model (HMM) as the basis by which they determine how well a sequence of words matches the supplied audio. The details of HMM's are known in the speech recognition industry and will not be presented in detail here. A HMM is configured by a set of parameters which describe a given speaker (or in the case of speaker independent recognition, a collection of speakers). The set of parameters that describe a given speaker are usually referred to as the audio profile for that speaker. The values of these parameters are calculated during a training process, where samples of audio and corresponding text are supplied to a training module, which searches for the values, that provide the best mapping of audio features to phonemes. It is an iterative process where the training module continues to refine the parameters as it receives more samples. There is no set end point where the training is finished, rather suppliers of recognition engines have a notion that after some number of minutes of training audio, the training reaches a point of diminishing returns. A new user will experience this when they are asked to read in a number of text samples, which the training module uses to create a profile for the (new) user. There is an alternative approach, used for offline users, who are usually clients of transcription services; they dictate audio into a device or application, which is uploaded to the transcription service, and the transcribed text is returned some while later to the user or a designated application. Profiles for these users are created by submitting transcription samples, which consist of the user's audio combined with the (human) transcribed text. Once a profile has been generated for the user, the speech recognition engine is used to create a first draft, which is finalized by a human editor. However, after the profile is created, there are no good tools to evaluate how good is the profile for the user.

Thus, against this background, it is desirable to provide apparatuses, systems, and methods to evaluate the user audio profile (generically referred to as profile).

SUMMARY

To attain the advantages and in accordance with the purpose of the technology of the present application, apparatuses, systems, and methods to evaluate a user audio profile are provided. The evaluation of a user audio profile allows for identification of potential causes of poor performing user audio profiles and potential types of remediation to increase the performance of the user audio profile.

In an exemplary embodiment of the technology of the present application, a user audio profile is trained using training text and audio pairs. The training text and audio pairs used for training or developing the user audio profile are subsequently used by the speech recognition to generate a phoneme sequence from the audio of the training text and audio pairs, which may be referred to as the audio phoneme sequence, and a phoneme sequence from the text of the training text and audio pairs, which may be referred to as the text phoneme sequence. The audio phoneme sequence and the text phoneme sequence are compared to determine a phoneme average accuracy.

The technology of the present application provides for determining the accuracy of the user audio profile by comparing the audio phoneme sequence to the text phoneme sequence, or the best matching text phoneme sequence if portions of the text have multiple "valid" pronunciations. In one aspect, the technology of the present application the comparison comprises a minimum edit distance to determine the phoneme error rate.

In certain aspects of the technology, the phoneme average accuracy is a total phoneme average accuracy for all the phonemes. In other aspects of the technology, the phoneme average accuracy is an individual phoneme average accuracy for a particular phoneme. In still other aspects, the technology of the present application provides for identifying the highest and lowest individual phoneme average accuracy. The technology of the present application also provides for identification of individual phonemes that were misrecognized and what incorrect phoneme was most often substituted for the correct phoneme. Other phoneme statistics may include, among others, the total number of times a particular phoneme was seen in the training text/audio pairs, the total number of times the particular phoneme was correctly identified by the HMM using the profile (which implicitly includes the total number of times the particular phoneme was incorrectly identified by the HMM using the profile), converting the total number of times and the total number of times the particular phoneme was correctly identified into an average accuracy for the particular phoneme, identifying the phoneme with the lowest (or highest) average accuracy, identifying or a number of phonemes having an average accuracy below a particular, preset threshold value or above a particular, present threshold, the total average accuracy, total mean accuracy, the phoneme any particular phoneme was misidentified as, and the like to name but a few statistics.

The technology provides for the generation of statistics regarding phoneme recognition and accuracy. In one aspect, the technology provides for identification of whether total phoneme average accuracy is below a total phoneme average accuracy threshold. Another aspect of the technology provides for identification of whether any individual phoneme average accuracy is below an individual phoneme average accuracy threshold, which threshold may be the same or different than the total phoneme average accuracy threshold.

The technology of the present application also provides several potential remedial measures to increases the performance of the user audio profile. In certain aspects, the remedial measures may include, for example, using more training text and audio pairs to train the user audio profile, re-positioning a microphone, speech coaching, establishing a better recording environment, and the like.

The foregoing and other features, utilities and advantages of the invention, will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

DETAILED DESCRIPTION

Figure 1:
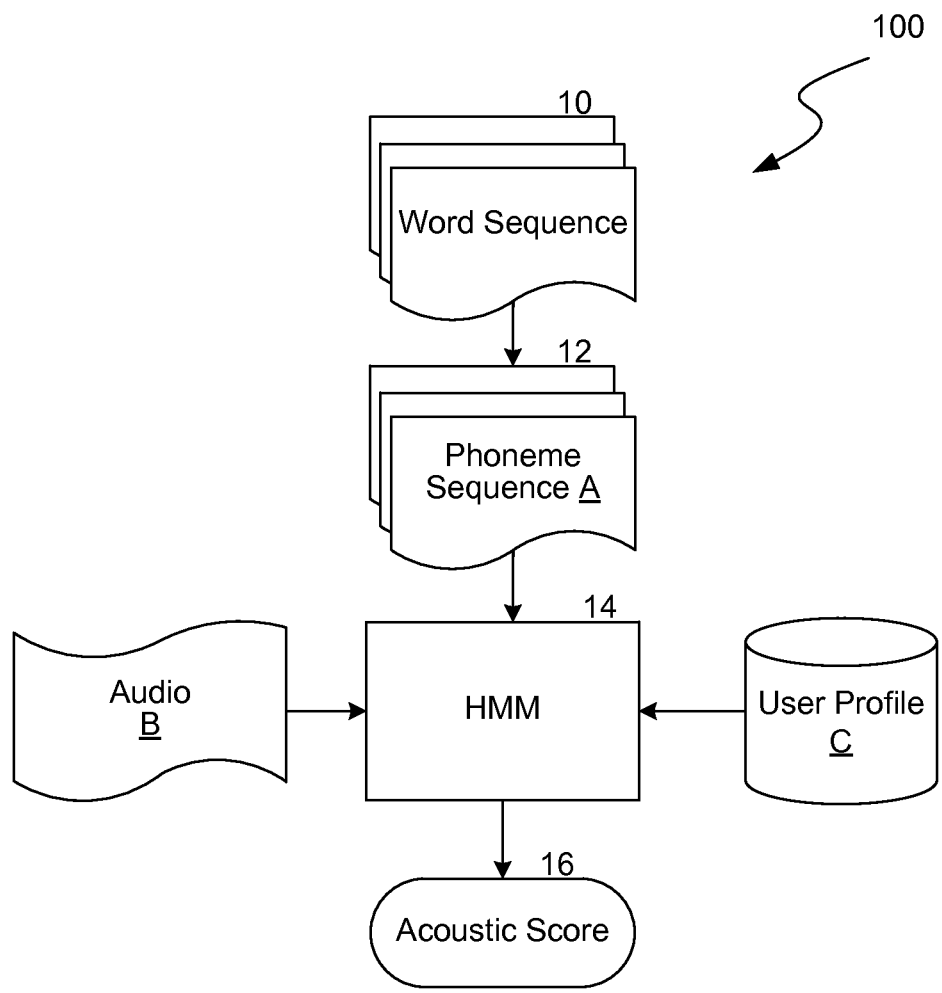
FIG. 1 is an exemplary flow diagram illustrative of a methodology for generating an acoustic score for speech recognition consistent with the technology of the present application.

The technology of the present application will now be explained with reference to the figures. While the technology of the present application is described in relation to a user audio profile for continuous speech recognition, one of ordinary skill in the art will recognize on reading the disclosure that the technology of the present application is usable with other applications including other speech recognition applications that use a tunable user audio profile to recognize audio.

The technology of the present application will be described with reference to particular discrete processors, modules, or parts, but one of ordinary skill in the art will recognize on reading the disclosure that processors may be integrated into a single processor or server, or separated into multiple processors or servers. Moreover, the technology of the present application will be described generically and portions of the present application may be loaded onto a particular user's client device or hosted by a server that is accessed by the client device or devices. Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

As mentioned above, continuous speech recognition can be thought of as a search process that generates candidate word sequences and selects the one with the highest score, which is a combination of how well the pronunciation of the word sequence matches the supplied audio, and how likely the word sequence is given the supplied language model (LM). A recognition engine uses a lexicon (or dictionary) to lookup the pronunciation, or pronunciations, of words, a LM to measure how likely a sequence of words is to be spoken, and a set of formatting rules to present the recognized words in a manner consistent with good writing style. Usually, recognition engines present word sequences which have the highest score of all the candidates that the engine considered. However, sometimes, it makes sense to present the best "N" candidates, and to use an external knowledge source (beyond what the recognition engine has built in) to select the best word sequence. The details of the LM and the means by which the engine combines the two scores of how well pronunciations of candidate word sequences match the corresponding audio and how likely the candidate word sequences are given the supplied LM is generally known in the art and will not be further explained herein except as necessary for an understanding of the technology of the present application. The technology of the present application focuses on how the engine determines how well a candidate sequence of words fits the supplied audio to determine how well the user audio profile performs. In other words, how effective a user audio profile is to tune a speech recognition engine to the speech of the user or speaker.

By way of background, however, when users of continuous speech recognition encounter inaccuracies, they are often stumped about how to reduce the inaccuracies or increase the effective recognition rate. If the users (sometimes referred to as clients) bought the product from a full service dealer, the users may be able to get help from the dealer. However, often the dealers may not be able to help increase accuracy of the continuous speech recognition because of the plethora of potential issues. Fixing a problem with accuracy depends on identifying the root cause, and there are multiple potential root causes for poor speech recognition performance. For example some potential root causes for poor speech recognition performance include: poor diction, external noise, cross talk (from other people nearby), poor microphone, poor positioning of the microphone, poor transmission (of audio), poor audio profile, missing words (or pronunciations) in the lexicon, poor language model, errors in the post-recognition formatting (referred to as "ITN" or "Inverse Text Normalization" or "Substitutions"). At first blush, this is a potentially overwhelming list to triage when any particular user encounters unacceptable speech recognition performance. The technology of the present application, however, has recognized the list of potential issues, above, generally have root causes that fall into several more tractable categories. For example, those listed first, manifest themselves as phonetic errors; in other words, the recognition engine will come up with the wrong phonemes, as though the speaker mispronounced a word. A second type of error of the above listed errors occurs when words are missing from the lexicon, the recognizer can never produce them, no matter how much the speaker tries. A poor language model will manifest itself as a transcription which runs along accurately for a while and then abruptly runs off the rails with a word sequence which sounds like what the speaker said, but which does not make sense in the context of the actual text. Often a poor language model will just as abruptly get back on course; but the pattern repeats. A third category of root causes may include post-recognition errors. Errors in post-recognition formatting are easy to spot—the words are correct if you read them out loud, but their presentation is not what would be expected, e.g., "wrong" date formats, incorrect capitalization of specialty words, and so on. The technology of the present disclosure focuses on the phonetic errors; in particular, those resulting from poor audio profiles. None of the currently available continuous speech recognition systems provide tools for users (or their support personnel) to analyze, diagnose, and remediate these errors. Given the high rates of user abandonment of continuous speech recognition systems, there is clearly value in providing such means to analyze and remediate causes of phonetic errors.

Conventional continuous speech recognition systems do not provide any insight into the quality of a user's audio profile. The only insight is the user's subjective experience of the final result: Is the recognition accurate? If a user receives good final results (or at least acceptable final results), one can infer that the audio profile is satisfactory. However, poor results, as discussed above, do not necessarily equate with any particular problem let alone a poorly performing audio profile. The two primary factors used by continuous speech recognition are the audio score, how well the phonemes for the words match the audio, and the LM score, how likely the sequence of words will occur.

The audio score measures how well the supplied audio matches the pronunciation of a sequence of words. In simplistic terms, an audio profile can be considered good if it awards a significantly higher score to the "right" word sequence than to any wrong (or simply other) word sequence, or, said another way, how good the audio score is at spotting the correct phonemes. A HMM can be used to generate the mostly likely sequence of phonemes for a supplied fragment of audio. The output of the HMM can be used to "score" or evaluate the user's profile. For example, a collection of matched audio and text samples can be provided, step 1. The audio is fed to the HMM to generate what it considers the mostly likely phoneme sequence from the audio, step 2. Truth text corresponds to the words as actually spoken whereas normalized text is the text as expected to be seen by a person. For example, the truth text may be "one dollar and ninety five cents" but the normalized text may be "1.95." Simultaneously, or in turn, the corresponding (truth) text is converted into its phoneme sequence (or sequences if the text contains words with multiple pronunciations), step 3. A direct comparison between the sequences using a standard calculation, such as "minimum edit distance", which would correspond to "phoneme error rate" in our discussion, yields an accuracy measure of the profile, step 4. In one aspect of the technology, the comparison can be performed using the text and audio samples that were used to train the profile in the first place. In other words, at the conclusion of training the user's audio profile, the same audio and text is used to generate an accuracy measure by using the same samples in the process described above. If the comparison is below a satisfactory performance level, which is typically associated with a predetermined accuracy, the user would next begin remediating the user profile, which may include additional training using audio/text pairs, speech training, microphone training or replacement, or the like as exemplified throughout the application.

The result of comparing phonemes generated using the user's profile with those from the pronunciation of the text samples also yields a collection of statistics. For example, for each of the approximately forty phonemes of US English, the systems and methods can generate an average accuracy for each of the phonemes. In one aspect, the technology of the present disclosure may calculate the percentage of the time that the component of the recognition engine containing the HMM identified the phoneme correctly. In another aspect, the technology of the present application may determine the total number of times a particular phoneme was encountered in the training set, such as by using an accumulator or counter. Thus, for each phoneme, the technology of the present application can determine the speech recognition's average accuracy and how often the phoneme is seen by the speech recognition.

This allows the profile to be considered from several points of view. As mentioned, in one aspect, the "average accuracy" for all the phonemes (both in total or for each of individual phoneme) is determinable. Looking specifically to the average accuracy for individual phonemes, a range of values is determinable that may identify, in particular, whether one or some of the phonemes score much worse than the average (or much better). A single or a few poorly recognized phonemes are likely to hurt overall recognition accuracy. Also, as the total number of times the phoneme was presented for recognition is available, it is possible to determine whether the poorly recognized phonemes also had low counts in the training samples. In other words, an average accuracy of 50% for a phoneme that was identified twice is not very telling (nor would an average accuracy of 100% for a phoneme that was only presented a limited number of times for recognition), but an average accuracy for a phoneme that was identified hundreds of times in the sample text may provide significant information. For average accuracy below a predetermined threshold with a predetermined number of presentations for recognition, one exemplary solution to increase accuracy may be to perform incremental profile training with text samples having better representation of the phonemes with low presentations.

If the average phoneme accuracy is low when a reasonable number of samples of the phoneme have been presented, the speaker is unlikely to get good recognition accuracy no matter how hard s/he tries, or how good the LM is. Generally, a user of speech recognition with low phoneme accuracy in the profile should not proceed with the speech recognition until the cause of the low score has been identified, remedied, and a new profile created. The risk of continuing is frustration and possible abandonment of the speech recognition due to the low recognition accuracy.

The above describes that possible reasons for low recognition accuracy include, among other things, poor diction. Poor diction includes, among other things, poor articulation of the words, and more importantly, the phonemes forming the words. Poor articulation or mispronunciation of words can be determined relatively easily from listening to the speaker or the audio recordings of the speaker, for example. A speaker with poor articulation will normally have an audio profile that receives a low scoring. Thus, for a speech recognition user with poor diction, and articulation, the fastest way to improve the accuracy for the speaker, is to coach the speaker to having a better articulation and then recreate the profile. If the speaker cannot, or is unwilling to, be coached in better articulation, the vendor (or speaker) is best advised to discontinue with speech recognition for this speaker.

In some instances, the profile of a speaker may be a low scoring profile, but it is clear from listening to the speaker's recorded audio that the problem is not in the speaker's diction. In these instances, the low score may be because of the audio capture, rather than the speaker's articulation. One solution to poor audio capture may be to swap out the microphone or repositioning the microphone. For example, if the problem is that the speaker is "chewing on the mic", the remediation may be to coach the user to position the microphone an appropriate and consistent distance from his mouth. "Chewing on the mic" is an expression in the industry of placing the microphone too close to the audio source generally saturating the microphone resulting in poor audio capture. Alternatively, the problem may be excessive ambient noise interfering with the audio. In these situations, the remediation is to coach the speaker to go to a quieter environment and recreate the profile. These examples of diagnosis and remediation are also testable. For example, after the remediation and recreation of the user's profile, the recreated user audio profile may be tested again as described herein. Assuming the remediation is effective, the new profile should have a significantly higher accuracy score.

While diction and microphone positioning are potential reasons for profiles having low accuracy scores, there may be several contributory causes of the original inaccuracy. Thus, while the above may improve accuracy of the profile, the (accuracy) statistics from the newly recorded profile may still be below acceptable levels.

In FIG. 1, a flow diagram 100 is provided showing an exemplary basic process by which a continuous speech recognition engine generates an acoustic score for a word sequence under consideration in its recognition search process. First, the word sequence is received, step 10. Next, the word sequence is translated into its equivalent sequence of phonemes representing its pronunciation, step 12. In some cases, there may be more than one sequence of phonemes if some of the words in the sequence have more than one pronunciation, in which case, the various alternate pronunciations can be scored and the highest score selected as the result. The phoneme sequence A, the audio segment B correlated to the phoneme sequence, and the profile C are passed into the part of the recognition engine containing the HMM, step 14, and the HMM calculates a score of how well the phonemes match the audio (or vice versa), step 16. In other words, the score is a representation or evaluation of how well the phonemes match the audio, etc. Often this is couched as a probability: in other words, the probability that the phoneme sequence, when uttered by the user, could have generated the supplied audio. The algorithms associated with the HMMs to perform this scoring are well known in the domain of speech recognition and their particular details and optimizations are not discussed except to the extent necessary for a complete understanding of the technology of the present application.

Figure 2:
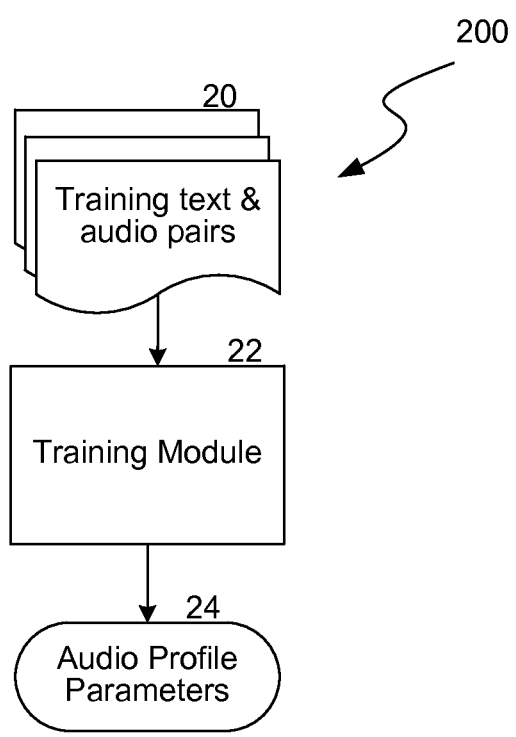
FIG. 2 is an exemplary flow diagram illustrative of a methodology for using training text and audio pairs to train a user audio profile for speech recognition consistent with the technology of the present application.

In FIG. 2, a flow diagram 200 is provided showing an exemplary process by which a speech recognition engine can adapt (or alter) the parameters of the HMM to a given speaker. Generally, this procedure is well known in the domain of speech recognition and the details of adapting the parameters of the HMM are not discussed except to the extent necessary for a complete understanding of the technology of the present application. First, a collection of training text and audio pairs are generated, step 20. Generally, the collection of training text and audio pairs are generated by a speaker reading known text (in other words, the training text) into a microphone (audio pair to the training text). In other words, the processor receives spoken audio corresponding to a correct and pre-known phoneme sequence. However, training text and audio pairs may be generated from audio transcribed by a human transcriptionist (although one needs to supply truth text rather than normalized text). As mentioned above, the truth text comprises the literal words the user speaks in the order spoken, whereas the human reader may prefer re-ordered and symbolized text. The example of "one dollar and ninety five cents" provided earlier would be normalized by a human transcriptionist to "1.95" in most cases. The training text and audio pairs are submitted to a training module, step 22. The audio is the speaker saying the text in the submitted pair. The training module uses these pairs to iteratively adjust the parameters of the HMM to the speaker, step 24.

Figure 3:
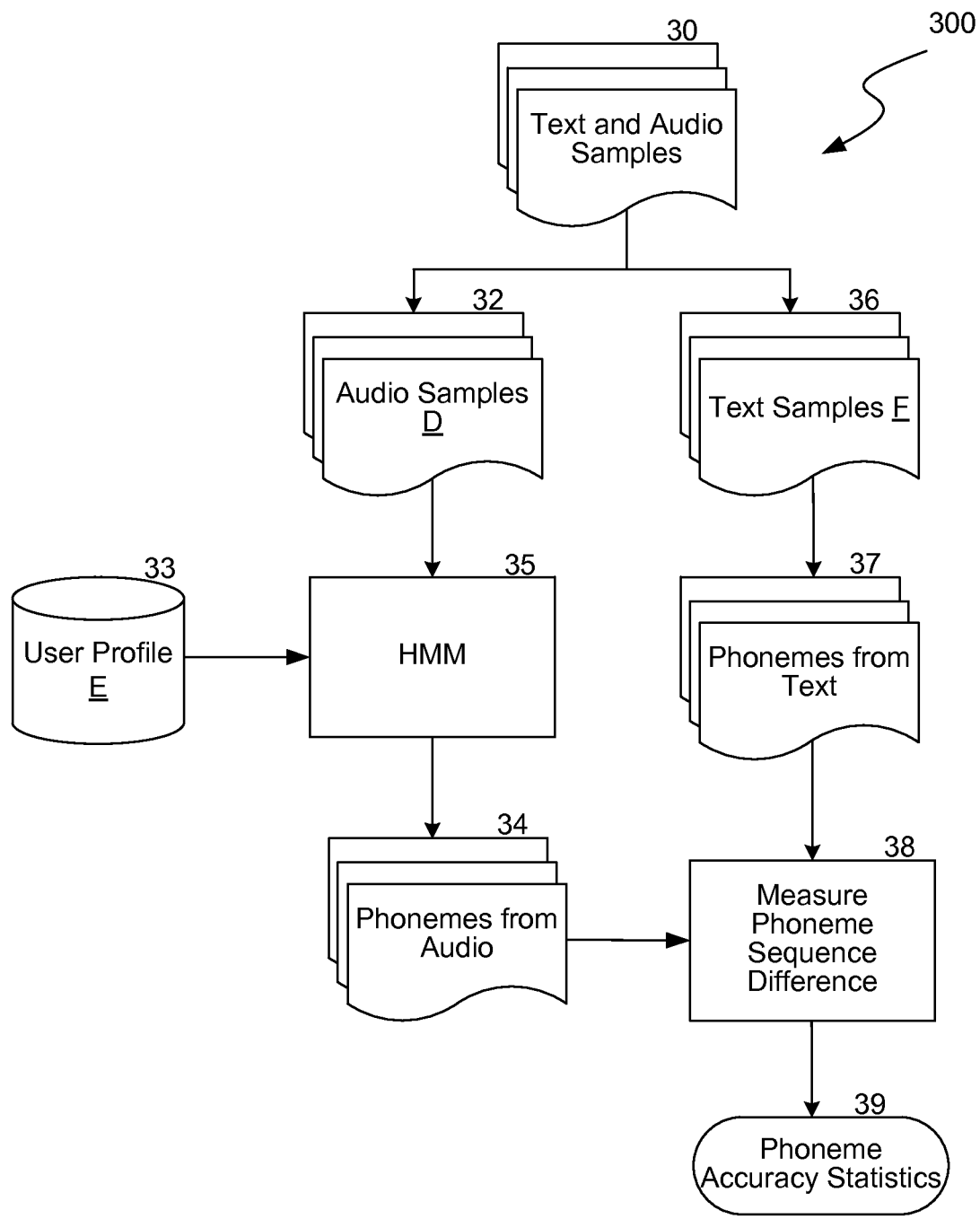
FIG. 3 is an exemplary flow diagram illustrative of a methodology for generating phoneme average accuracy and statistics consistent with the technology of the present application.

In FIG. 3, a flow diagram 300 is provided showing an exemplary embodiment for generating accuracy statistics for a given speaker's profile. First, the HMM is configured with the parameters from the user's audio profile. Step 30. Next, audio samples D from matching pairs of training text and audio (see above) are submitted to the part of the recognition engine containing the HMM, step 32. Notice, while matching pairs of training text and audio are used in the present exemplary embodiment, the technology of the present application may use any set of matched or correlated text and audio. The HMM also receives the profile E, step 33. The HMM generates from the audio the best matching sequence of phonemes, step 34. In other words, the generated phoneme sequence is the sequence that has the highest audio score generated by the HMM, step 35. At substantially the same time, on a parallel track, the training text F that corresponds to the audio segment is received, step 36. The training text F is translated into an equivalent phoneme sequence, or sequences if some words have multiple pronunciations, step 37. Similar to letters, each word in a language has at least one phonetic spelling consisting of a string of phonemes, of which there are about 40 in the English language. Thus, you can translate any sequence of words into at least one phoneme sequence. Notice, while this is described as being done at substantially the same time, the above processes could be performed sequentially rather than in parallel. Next, the phoneme sequences generated by the HMM from the audio samples D and from the phonemes generated from the training text F are compared, step 38. The comparison outputs a phoneme accuracy statistic, step 39, explained further below. If there are multiple pronunciations for the text sample, the comparison is run using all the possible pronunciations, and the process selects the phoneme sequences from the training text that has the closest match or highest phoneme accuracy. There are a variety of algorithms that can be used to compare two sequences of tokens. One exemplary method, but by no means the only and without loss of generality, includes a "minimum edit distance" calculation (also known as the "Word Error Rate" when the tokens in the sequence are words) as a representative measure of the difference between two phoneme sequences. One common variant of minimum edit distance is known as the Levenshtein Distance. Other variants include, for example, longest common subsequence, Hamming distance, Jaro-Winkler distance, and the like. In other words, the lower the minimum edit distance calculation, the better the sequences match. When this comparison is performed for a number of text and audio samples, it is possible to generate the statistics described above for each phoneme. For example, it is possible to generate a total count of how many times each phoneme occurs in the sample set (training text and audio pairs), how often the phoneme was recognized correctly, the phoneme's overall accuracy (as well as the accuracy in total—the average of all the phoneme's average accuracy), and the "incorrect phonemes" the "correct phoneme" was confused with. Additionally, aggregate statistics can be generated, such as the average accuracy of all phonemes. Additionally, the comparison may be used to identify the phonemes with the highest and lowest accuracies. Of course, these are but a few examples of the statistics that can be generated, and it is the intent of this disclosure to allow for any statistics of interest to be tabulated as a result of the analysis process laid out by the technology of the present application.

Figure 8A:
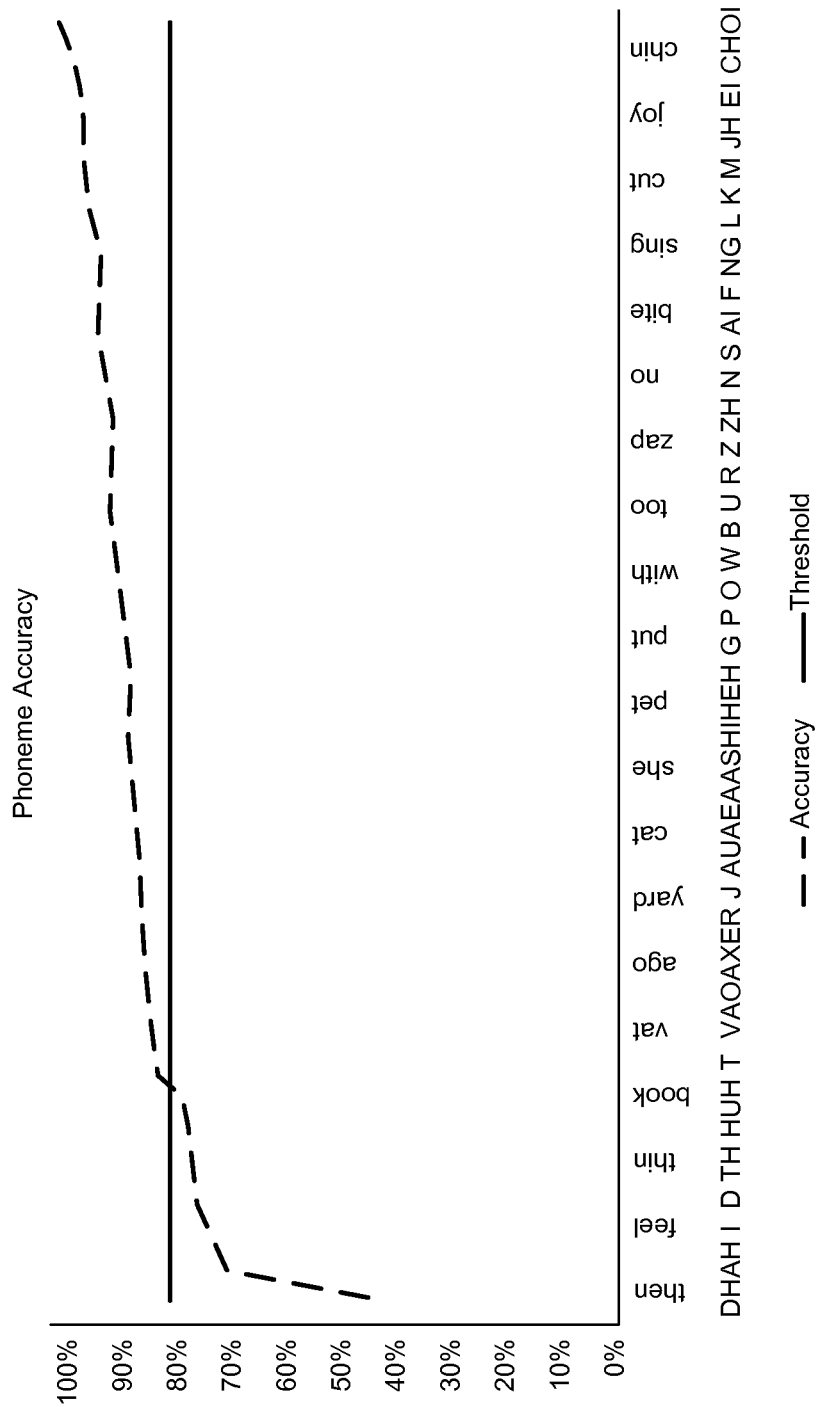
FIGS. 8A and 8B show exemplary statistics generated using one possible measurement consistent with the technology of the present application
Figure 8B:
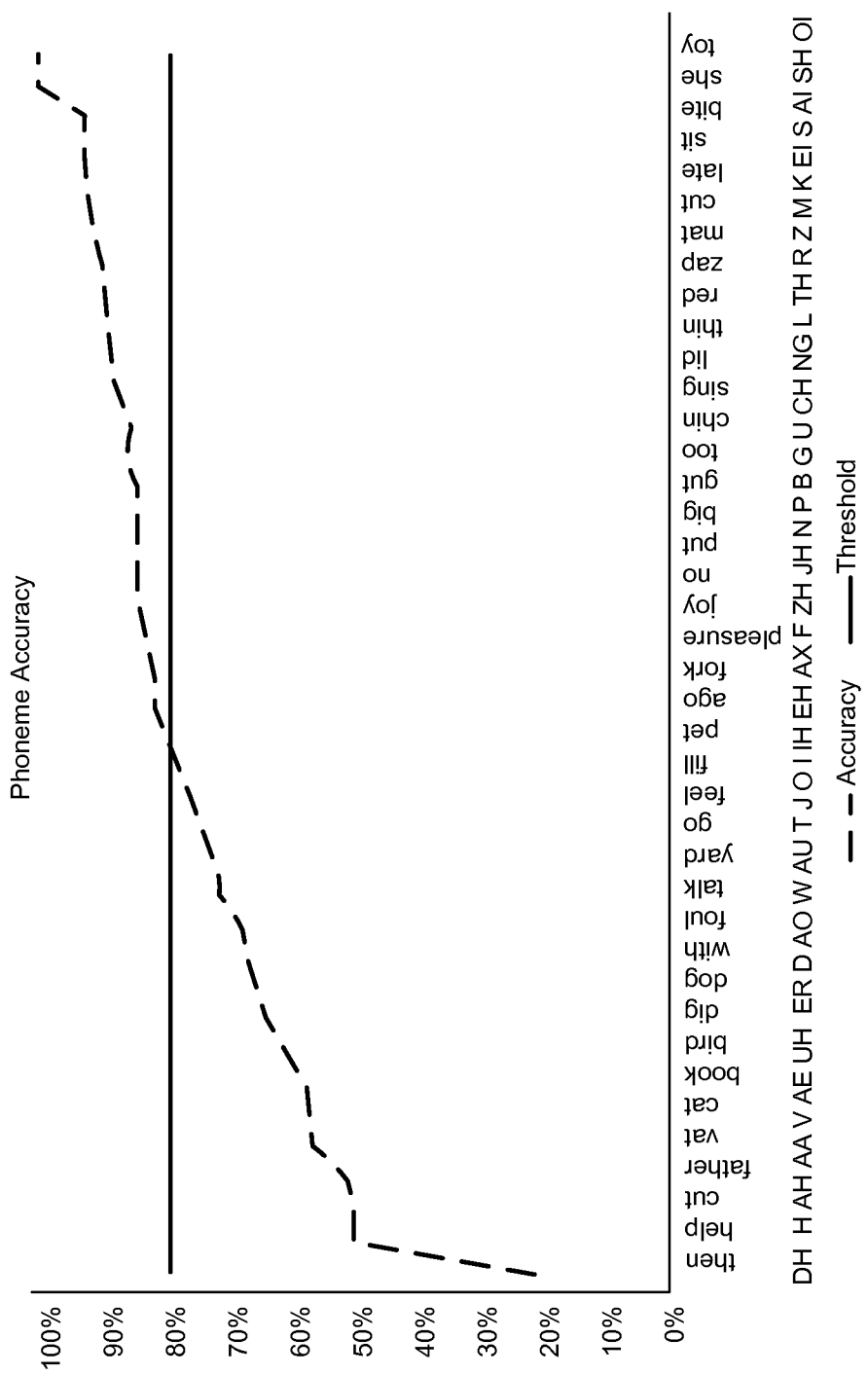

FIGS. 8A and 8B show exemplary charts generated using one possible measurement consistent with the technology of the present application. The charts are presented as simple graphs with the phoneme accuracy as the Y-axis and the 40 possible phonemes associated with the English language as the X-axis. The phoneme accuracy is presented as a simple percentage, which is generated by the number of correct phoneme identifications divided by the total number of phoneme presentations times 100. A predefined threshold of 80% was established as the cutoff between an acceptable recognition and an unacceptable recognition. The chart shown in FIG. 8A represents a generally good audio profile as the accuracy in the recognition of a majority of the individual phonemes is over the set accuracy threshold of 80%. The actual recognition is shown by table 1 below:

TABLE 1

| Phoneme | Example | Accuracy | Total Uses | Threshold |
|---------|---------|----------|------------|-----------|
| DH | then | 42% | 792 | 80% |
| AH | cut | 70% | 780 | 80% |

TABLE 1-continued

| Phoneme | Example | Accuracy | Total Uses | Threshold |
|---------|---------|----------|------------|-----------|
| I | feel | 74% | 3552 | 80% |
| D | dig | 76% | 2371 | 80% |
| TH | thin | 76% | 193 | 80% |
| H | help | 77% | 907 | 80% |
| UH | book | 78% | 101 | 80% |
| T | talk | 83% | 2889 | 80% |
| V | vat | 84% | 700 | 80% |
| AO | dog | 84% | 610 | 80% |
| AX | ago | 85% | 4792 | 80% |
| ER | bird | 85% | 321 | 80% |
| J | yard | 85% | 151 | 80% |
| AU | foul | 85% | 116 | 80% |
| AE | cat | 86% | 1119 | 80% |
| AA | father | 86% | 687 | 80% |
| SH | she | 87% | 721 | 80% |
| IH | fill | 88% | 2509 | 80% |
| EH | pet | 88% | 1152 | 80% |
| G | gut | 88% | 311 | 80% |
| P | put | 89% | 1756 | 80% |
| O | go | 89% | 722 | 80% |
| W | with | 89% | 596 | 80% |
| B | big | 90% | 638 | 80% |
| U | too | 90% | 355 | 80% |
| R | red | 91% | 3516 | 80% |
| Z | zap | 91% | 1259 | 80% |
| ZH | pleasure | 91% | 23 | 80% |
| N | no | 92% | 3105 | 80% |
| S | sit | 93% | 2211 | 80% |
| AI | bite | 93% | 682 | 80% |
| F | fork | 93% | 680 | 80% |
| NG | sing | 93% | 425 | 80% |
| L | lid | 95% | 1659 | 80% |
| K | cut | 95% | 1255 | 80% |
| M | mat | 96% | 1175 | 80% |
| JH | joy | 96% | 181 | 80% |
| EI | late | 97% | 795 | 80% |
| CH | chin | 98% | 171 | 80% |
| OI | toy | 100% | 31 | 80% |

The chart, as can be appreciated, is organized by the phonemes from the least accurately recognized phoneme, DH, to the most accurately recognized phoneme, OI. From this information, the various statistics previously mentioned can be determined. In one exemplary aspect of the technology of the present application, the phoneme accuracy recognition statistic may be provided as feedback, either delayed feedback or real-time feedback, to the user or speaker. Thus, the speaker while speaking will see, for example, the low accuracy associated with the DH phoneme, which is shown by the exemplary word then, and the speaker can focus additional effort on correctly pronouncing the phoneme to increase the specific accuracy. For comparison, FIG. 8B shows a similar chart for a second speaker where the accuracy is particularly poor. As can be appreciated, a large number of the individual phonemes are not recognized at the set threshold of 80%, with approximately half of the total phonemes not being above the required threshold. This audio profile would be ideal for remediation once the root cause was determined, which may be diction or pronunciation or other problems as identified above.

Figure 4:
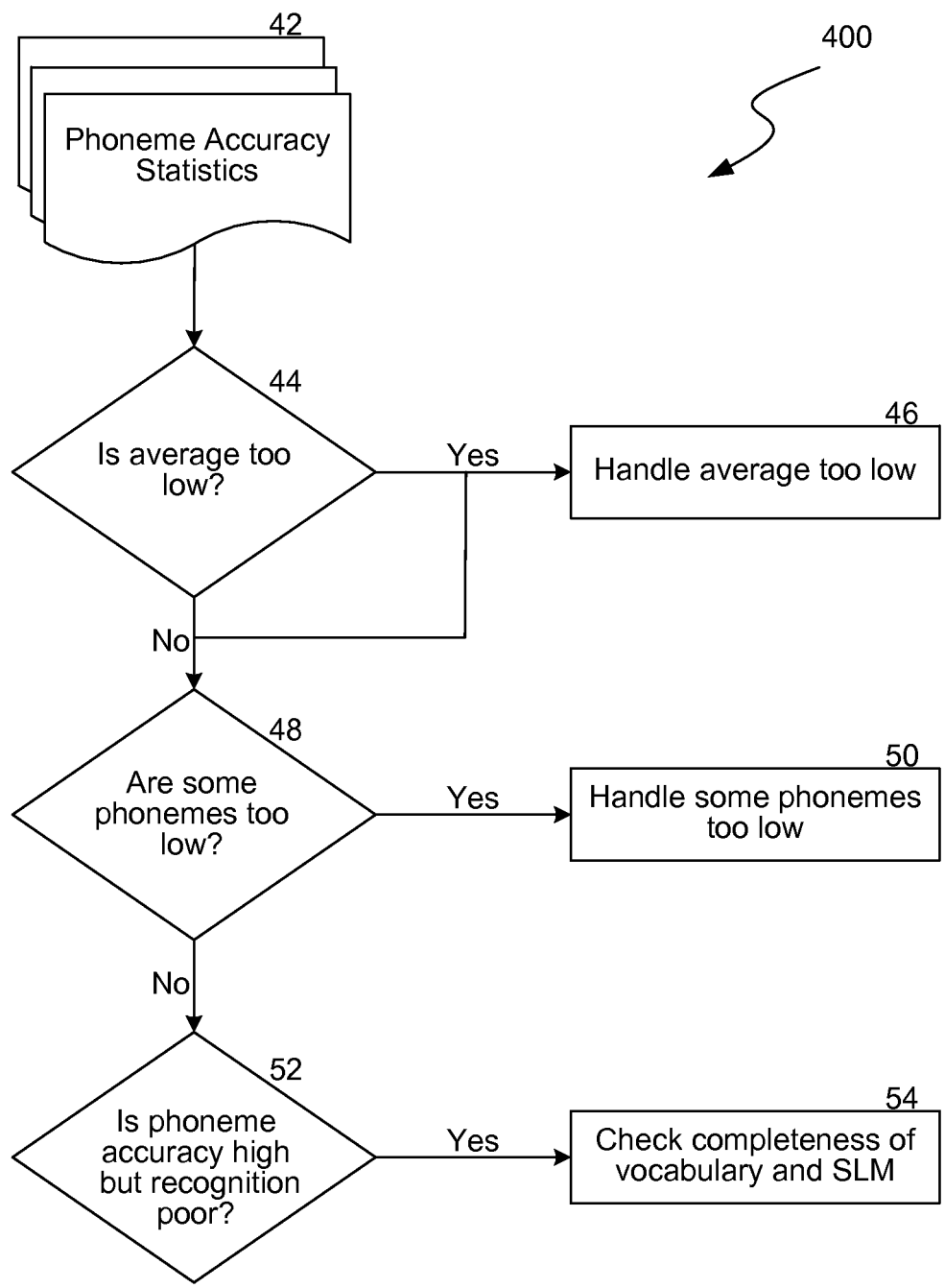
FIG. 4 is an exemplary flow diagram illustrative of a methodology for using the phoneme average accuracy and statistics of FIG. 3 to increase the recognition accuracy of the speech recognition consistent with the technology of the present application.

FIG. 4 provides a flow diagram 400 of an exemplary process by which the phoneme accuracy statistics can be used to diagnose and remediate one or more causes of inaccuracy in the speech recognition. The process starts with the collection of statistics generated from a collection of matching and scoring text and audio samples, step 42, such as the exemplary statistics associated with FIGS. 8A and 8B. As mentioned above, the process of evaluating the profile by generating a phoneme sequence that matches the audio and comparing it to the phoneme sequence from the known text (from the training text and audio pairs) allows for the generation of many statistics. The statistics include, among other possible statistics, the total number of times a particular phoneme was seen in the training text/audio pairs, the total number of times the particular phoneme was correctly identified by the HMM using the profile (which implicitly includes the total number of times the particular phoneme was incorrectly identified by the HMM using the profile), converting the total number of times and the total number of times the particular phoneme was correctly identified into an average accuracy for the particular phoneme, identifying the phoneme with the lowest (or highest) average accuracy, identifying one or a number of phonemes having an average accuracy below a particular, preset threshold value or above a particular, present threshold, the total average accuracy, total mean accuracy, the phoneme any particular phoneme was misidentified as, and the like to name but a few statistics. Looking at a few of the identified statistics, the process 400 entails a series of tests based on the statistics on accuracy, only some of which are illustrated in the figures. In other words, the tests described here are by no means the only ones that can be performed, but they are exemplary of the tests that should have some value in the diagnosis and remediation of causes of inaccuracy for speech recognition. Also, the test(s) outlined specifically, as well as others, may be performed in any particular order, in parallel or sequentially as a matter of design choice. In this exemplary flow diagram 400, the first test illustrated is a determination of whether the overall average accuracy of the phonemes is below some threshold value, step 44. The precise value is not important, save that it exists and informs the person running the diagnosis and remediation that this branch of the decision tree should be pursued further. Thus, if it is determined that the average accuracy is below the threshold, which may be identified as the total average accuracy threshold, total phoneme average accuracy rather than the accuracy of any particular phoneme, the remediation process for correcting the total phoneme average accuracy is carried out, step 46. One possible remediation for a total phoneme average accuracy being below the threshold may be diction coaching as outlined herein. If it is determined that the total phoneme average accuracy is above a threshold, process 400 performs a subsequent test such as a determining of whether any individual phoneme average accuracy are below an individual phoneme average accuracy threshold, step 48. Notice that even if the determination of the previous test results in a remediation process being initiated, the subsequent tests on the statistics may be performed as multiple types of remediation may be required to correct the poor accuracy of the speech recognition. In this exemplary flow diagram 400, the next test performed is the case where the average accuracy of phonemes is acceptable (or in some cases, when the average accuracy is unacceptable as well), but there are at least a few phonemes with unacceptably low scores that warrant further investigation and/or remediation, step 48. If it is determined that at least a few phonemes have unacceptably low scores, the next step is to investigate and remediate the at least a few phonemes with unacceptably low scores, step 50. An example of one exemplary type of investigation and/or remediation is further described below with reference to FIG. 6. It should be noted that a few particularly low individual phoneme average accuracy scores may pull the total phoneme average accuracy to below the total phoneme average accuracy threshold—this may be one of the investigative pieces of the subsequent remediation process 46. After some or all of the phoneme statistics are investigated, two of such investigations are outlined above in steps 44, 46, 48, and 50, the process may determine whether the recognition accuracy is below a threshold when the phoneme (total and individual) average accuracy is satisfactory, step 52. If it is determined that the speech recognition accuracy is below a threshold when the phoneme (total and individual) average accuracy is satisfactory, the vocabulary and/or the language model may be checked for completeness, step 54, as it is indicative that the problem with the speech recognition is not associated with the audio profile. If it is determined that the phoneme (total and individual) average accuracy is satisfactory, and the speech recognition accuracy is satisfactory, the speech recognition should be functioning properly, and the process terminates (not specifically shown in the drawings).

Figure 5:
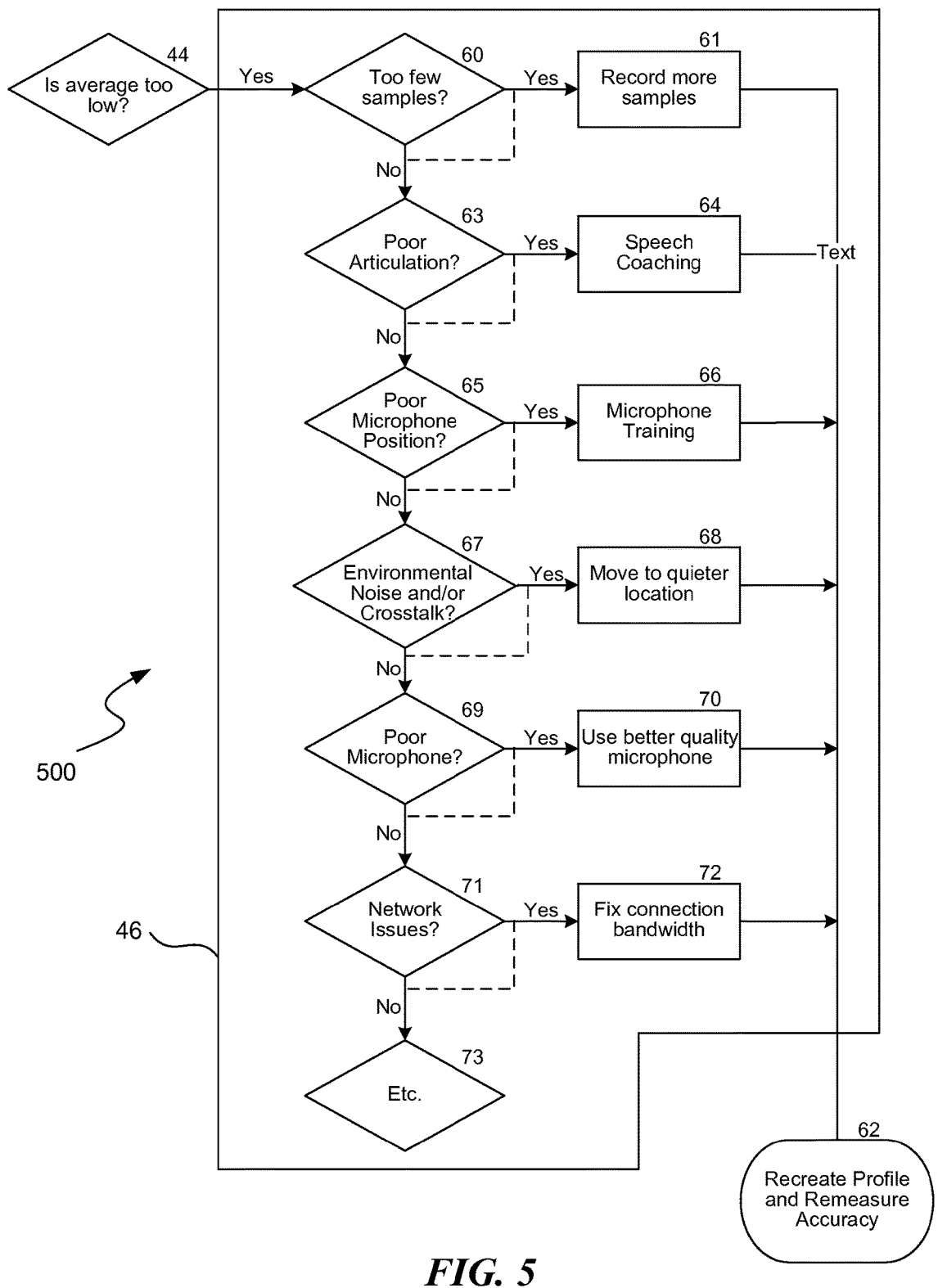
FIG. 5 is an exemplary flow diagram illustrative of a methodology for using the phoneme average accuracy and statistics of FIG. 3 to increase the recognition accuracy of the speech recognition consistent with the technology of the present application.

FIG. 5 illustrates a flow diagram 500 providing one exemplary methodology of diagnosis and remediation when the overall (or total) phoneme average accuracy is considered to be too low. While flow diagram 500 illustrates some exemplary methodologies and embodiments, it should be noted that the flow diagrams herein are exemplary and not exhaustive of the embodiments for diagnosis and remediation. In other words, there are a number of tests that can be performed of which only some are illustrated in flow diagram 500. Therefore, flow diagram 500 is not intended to be an exhaustive list, but is illustrative of issues that are encountered with new (and sometimes established) users of speech recognition. Also, while shown as a series of tests, the test may be performed in series, in parallel, or in alternative orders. Also, while each determination listed below leads to a particular remediation type, the flow diagram 500 may continue to review other potential causes of overall phoneme average accuracy being below the total phoneme average accuracy threshold as multiple issues may be part of the overall low accuracy. However, in certain embodiments, it may be beneficial to correct individually identified problems prior to moving onto other potential problems.

Once the determination at step 44 of FIG. 4 is made that the total phoneme average accuracy is below a total phoneme average accuracy threshold, the flow diagram 500 moves to the first test, step 60. In this exemplary embodiment, the first test, at step 60, is a determination of whether the collection of samples (training text and audio pairs) was simply too small for the training module to generate a good set of parameters in the user's profile. For example, the minimum sample size may be set to a predefined minimum value. If it is determined that the collection of samples is below the predefined minimum value, the remediation may be to record more audio for the training text audio pairs and train the audio profile, step 61. In other words, the remediation is relatively straight forward: generate additional training text and audio pairs and submit them to the profile training engine to enhance the user's profile (which may simply entail completing the initial training sequence). After the remediation of step 61 has been performed, the process as illustrated by flow diagram 500 recreates the profile and measures the accuracy score of the recreated profile, step 62. At this point, the process returns, for example, to step 44 to determine if the total phoneme accuracy is still below the total phoneme accuracy threshold; in other words, if there are additional causes of inaccuracy which need to be remediated. Another exemplary test to perform when the total phoneme accuracy is below a total phoneme accuracy threshold is to determine whether the speaker has poor articulation, step 63. Determining whether the speaker has poor articulation may involve listening to the audio of the training text and audio pairs. By way of background, some speakers come to speech recognition after years of recording audio for human transcriptionists, one exemplary profession includes the medical profession having medical transcriptions. These speakers often have poor articulation, not necessarily because of their ability, but because they have been trained that it is ok to provide audio that is both hurried and poorly articulated as the human transcriptionist is typically well versed in the industry and can compensate for poor articulation and the like. However, poor articulation of diction is difficult for automated speech recognition. Thus, if it is determined that the cause of the low total phoneme accuracy is due to articulation (or pronunciation), one exemplary remediation is speech coaching, step 64, which remediation may include teaching the user to speak clearly at an even pace. Another test may include determining whether the speaker has the microphone positioned appropriately, step 65. For example, as outlined briefly above, some speakers hold or position the microphone much too close to their mouths (the aforementioned "chewing on the mic"), or they keep repositioning it so that recorded audio is sometimes too loud and sometimes too faint, which provides signal to noise, clipping, or audio saturation problems. The remediation, if it is determined that the microphone is improperly or not appropriately positioned, is microphone training or positioning, step 66. Another test is to determine whether environmental noises are the source of poor performance, step 67. One way to determine whether environmental noises are the source of poor performance is to listen to the audio and evaluate whether there are external noise sources that are drowning out the speaker. One exemplary remediation is for the speaker to go to a quieter environment, step 68. Another exemplary test is to determine whether the microphone itself has problems, step 69. For example, it may only record "narrow band" audio, which limits the range of frequencies available to the engine to analyze, and this, in turn, impacts accuracy. The remediation is usually as simple as obtaining and using a better or higher audio quality microphone, step 70. The microphone replacement also may be useful for decreasing environmental noises associated with the remediation of step 68. The final test, in this exemplary flow diagram 500, includes determining whether the transmission network has problems, step 71. Network problems may include, among other things, packet losses, which degrades the audio that the recognition engine receives, data corruption, low throughput, low signal to noise ratios, and the like. The remediation for such a problem may include corrective network steps such as, for example, to route the audio over a network segment without the problems, step 72. As described specifically above with respect to the preparation of additional training text and audio pairs, the profile is recreated and the accuracy is measured after the recreation to see if the remediation was successful or if additional remediation is necessary. Also, as identified above, flow diagram 500 provides only a limited number of exemplary tests. As shown by step 73, additional tests for the total phoneme average accuracy are possible.

Figure 6:
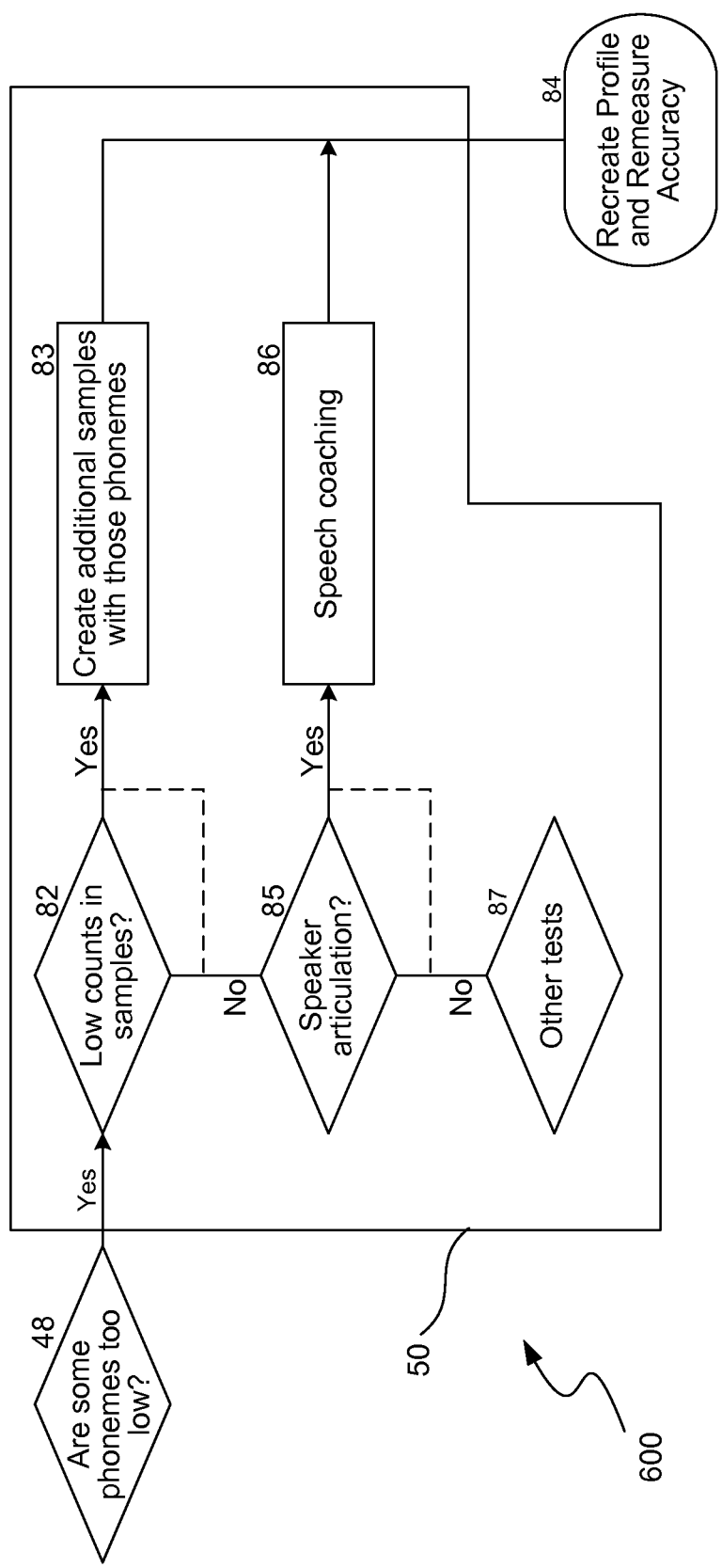
FIG. 6 is an exemplary flow diagram illustrative of a methodology for using the phoneme average accuracy and statistics of FIG. 3 to increase the recognition accuracy of the speech recognition consistent with the technology of the present application.

FIG. 6 provides an illustrative flow diagram 600 of a process to diagnosis and remediate when it is determined that certain (at least one) of the phonemes have individual phoneme average accuracies that are below an individual phoneme average accuracy threshold. While flow diagram 600 illustrates some exemplary methodologies and embodiments, it should be noted that the flow diagram is exemplary and not exhaustive of the embodiments. In other words, there are a number of tests that can be performed of which some are illustrated in flow diagram 600. Therefore, flow diagram 600 is not intended to be an exhaustive list, but is illustrative of issues that are encountered with new (and sometimes established) users of speech recognition. Also, while shown as a series of tests, the tests may be performed in series, in parallel, or in alternative orders. Also, while each determination listed below leads to a particular remediation type, the flow diagram 600 may continue to review other potential causes of overall phoneme average accuracy being below the total phoneme average accuracy threshold as multiple issues may be part of the low accuracy. However, in certain embodiments, it may be beneficial to correct individually identified problems prior to moving onto other potential problems.

Again, the tests and remediation, shown in FIG. 6 as part of step 50, are illustrative of the diagnostic tests and types of remediation that may be performed, and the enumerated tests and types of remediation are not meant to be exhaustive. In this exemplary flow diagram 600, one exemplary test or investigation is to determine whether the individual phoneme does not have a sufficient number of data points, step 82. In other words, the investigation for any individual phoneme average accuracy being below a predetermined individual phoneme average accuracy threshold is to examine the aggregate statistics of the profile training samples to see if the individual phonemes were under represented in the training set. One exemplary remediation, if it is determined the individual phoneme was under represented, is to generate additional training text and audio pairs having more instances of the individual phonemes, step 83. Once the additional training text and audio pairs are generated, and used to re-generate the profile, the accuracy score may be measured to determine whether the remediation was successful, step 84. Another exemplary test includes listening to the audio from the training text and audio pairs to determine whether the speaker's articulation is poor, step 85, such as, for example, having a tendency to pronounce the phonemes in unexpected ways, or perhaps, to leave them out altogether. Similar to the above diction problem in FIG. 5, the remediation may include speech coaching to train the speaker how to speak to a recognition engine, step 86. One the speech coaching is complete, the profile is re-generated, and the accuracy score for the profile may be measured to determine whether the remediation was successful, step 84. Also, as identified above, flow diagram 600 provides only a limited number of exemplary tests. As shown by step 87, additional tests for the total phoneme average accuracy are possible.

The technology of the present application described above as well as the Figures illustrate process by which continuous speech recognition engines can generate average phoneme or audio accuracy scores and certain statistics, by no means exhaustive, using supplied sequence of words, train user profiles, generate accuracy statistics for audio profiles, and illustrative diagnostic and remediation procedures for causes of inaccuracy.

Figure 7:
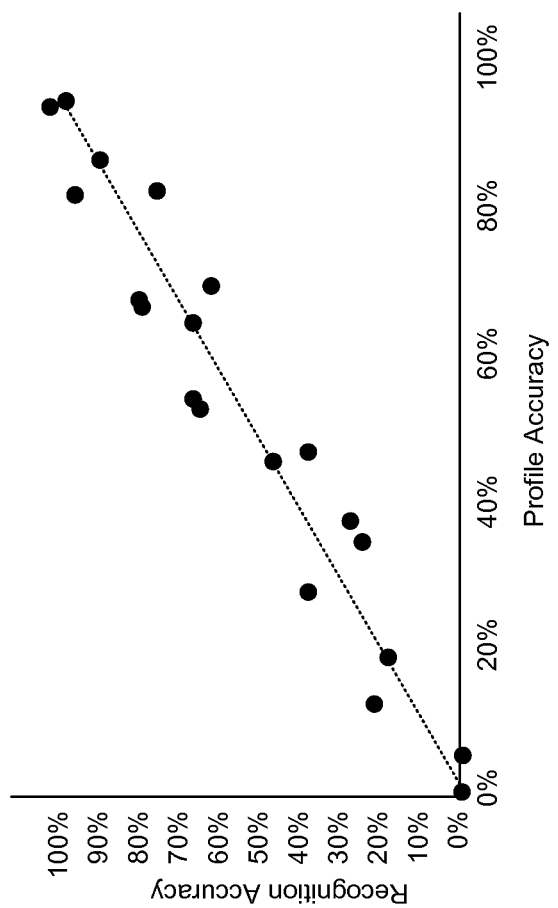
FIG. 7 is a chart illustrative of charting estimating recognition accuracy based on audio profile accuracy consistent with the technology of the present application.

Whether these diagnostic tests and subsequent types of remediation are performed, the profile statistics, especially the phoneme accuracy scores (including the total phoneme accuracy scores as well as the individual phoneme accuracy scores), have predictive utility. As noted herein, continuous speech recognition is essentially a search process to find word sequences with the maximum combined audio and LM scores. Thus, the accuracy of the text returned by the engine depends on the fidelity of the speaker's audio profile as well as the LM being used. This means that the phoneme accuracy statistics will correlate with achievable accuracy for the speaker and so it is possible to predict from a given speaker's profile accuracy statistics the expected accuracy for his speech recognition, as illustrated in FIG. 7, which is an illustrative plot of recognition accuracy versus profile accuracy for a collection of speakers.

The ability to predict the achievable recognition accuracy based on accuracy statistics for a speaker's profile has an economic value. Consider, for example, a transcription service that uses a combination of speech recognition to generate a first draft of what a client speaker said and then uses a human editor to make corrections to this draft and create a final version which can be returned to the client. The transcription service may have an economic interest in determining whether it is worthwhile using a recognition engine to prepare a first draft because the service's cost of preparing a final version is the sum of the cost of recognition plus the cost of the human time to edit the draft. Drafts below some threshold accuracy may have a higher final cost than if a transcriptionist transcribed the entire audio from scratch. Thus, when a new client is brought onto the service, it is of value to know whether their audio should be routed to speech recognition or to a transcriptionist. The technology of the present application generates accuracy statistics for a speaker's audio profile and uses the statistics to estimate, or predict, an achievable accuracy for this speaker, and by extension, predicts the relative economics of automated transcription (to prepare a draft) plus editing (human editing of the automatically generated transcript) versus human transcription and editing straight from the audio.

Figure 9:
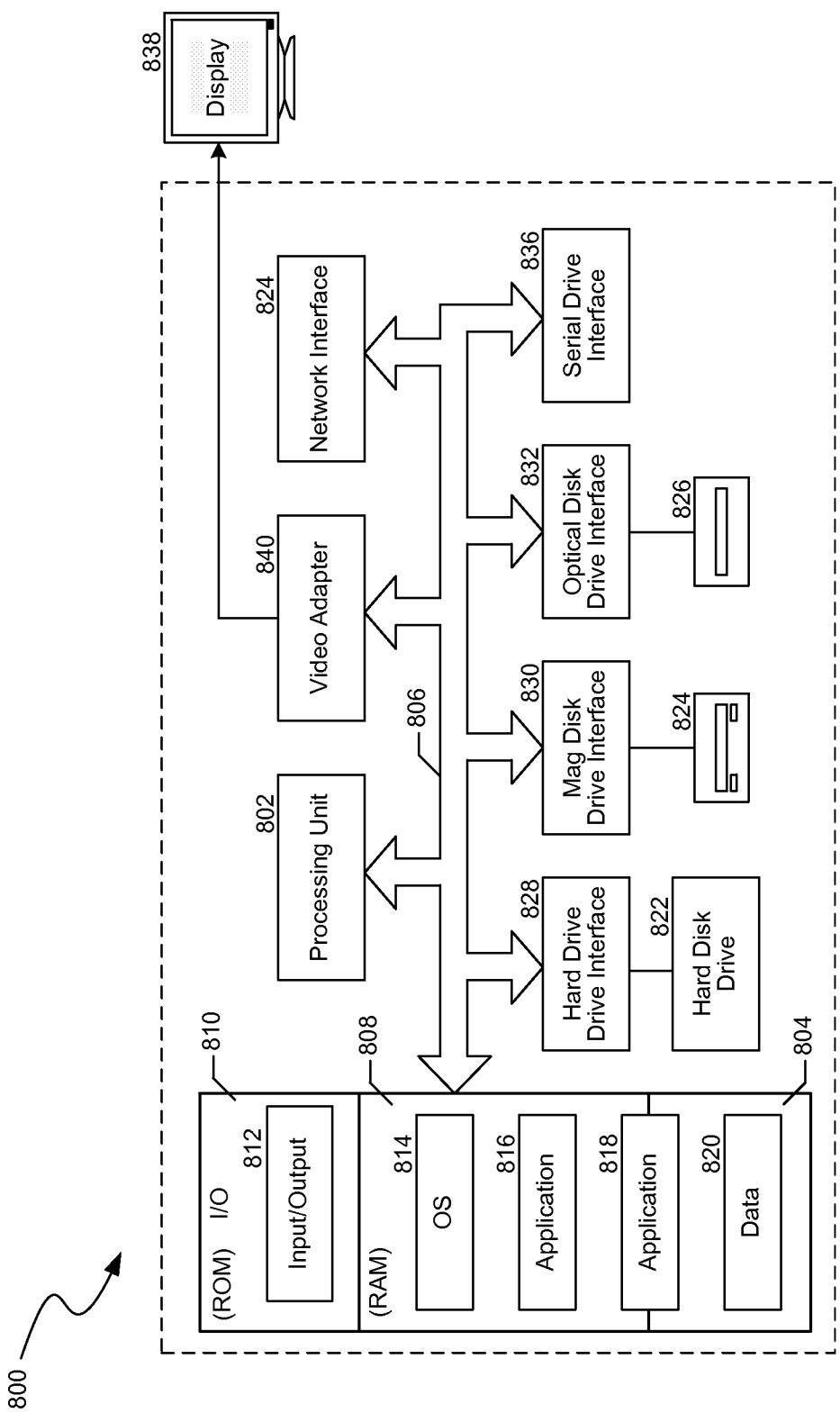
FIG. 9 is a functional block diagram of a device on which the technology of the present application may be implemented.

Referring now to FIG. 9, a functional block diagram of a typical device 800 on which the technology of the present application may function. The device 800 is shown as a single, contained unit, such as, for example, a desktop, laptop, handheld, or mobile processor, but client device 800 may comprise portions that are remote and connectable via network connection such as via a LAN, a WAN, a WLAN, a Wi-Fi Network, Internet, or the like. Generally, the device 800 includes a processor 802, a system memory 804, and a system bus 806. The system bus 806 couples the various system components and allows data and control signals to be exchanged between the components. The system bus 806 could operate on any number of conventional bus protocols. The system memory 804 generally comprises both a random access memory (RAM) 808 and a read only memory (ROM) 810. The ROM 810 generally stores a basic operating information system such as a basic input/output system (BIOS) 812. The RAM 808 often contains the basic operating system (OS) 814, application software 816 and 818, and data 820. The system memory 804 contains the code for executing the functions and processing the data as described herein to allow the present technology of the present application to function as described. The device 800 generally includes one or more of a hard disk drive 822 (which also includes flash drives, solid state drives, and etc. as well as other volatile and non-volatile memory configurations), a magnetic disk drive 824, or an optical disk drive 826. The drives also may include zip drives and other portable devices with memory capability. The drives are connected to the bus 806 via a hard disk drive interface 828, a magnetic disk drive interface 830 and an optical disk drive interface 832, etc. Application modules and data may be stored on a disk, such as, for example, a hard disk installed in the hard disk drive (not shown). The device 800 has network connection 834 to connect to a local area network (LAN), a wireless network, an Ethernet, the Internet, or the like, as well as one or more serial port interfaces 836 to connect to peripherals, such as a mouse, keyboard, modem, or printer. The device 800 also may have USB ports or wireless components, not shown.

The device 800 typically has a display or monitor 838 connected to bus 806 through an appropriate interface, such as a video adapter 840. Monitor 838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology. The speech recognition engines may have similar constructions.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method, performed by at least one processor, of evaluating and increasing performance of a user audio profile for speech recognition, the method comprising:
   (a) providing a speech recognition engine with a user audio profile to be evaluated;
   (b) inputting audio of a matched audio and text pair into the speech recognition engine provided with the user audio profile, wherein the matched audio and text pair comprises the audio and a known text, and wherein the known text is provided to a user and the audio corresponds to the known text being spoken by the user;

(c) thereafter generating from the audio of the matched audio and text pair, using the speech recognition engine, an audio phoneme sequence, wherein the audio phoneme sequence comprises a first sequence of phonemes corresponding to the audio of the known text being spoken by the user;

(d) translating, the known text of the matched audio and text pair into at least one text phoneme sequence, wherein the known text has at least one pronunciation associated therewith, and wherein the at least one text phoneme sequence comprises at least one second sequence of phonemes representing the at least one pronunciation of the known text;

(e) comparing the audio phoneme sequence to the at least one text phoneme sequence to generate a phoneme error rate using a minimum edit distance between the audio phoneme sequence and the at least one text phoneme sequence;

(f) evaluating the user audio profile by using the comparison of the audio phoneme sequence to the at least one text phoneme sequence, wherein said evaluating comprises determining whether each individual phoneme of the audio phoneme sequence matches each individual phoneme of the text phoneme sequence; and (g) remediating the user audio profile, wherein remediating the user audio profile comprises training the user audio profile, generating a new user audio profile, or a combination thereof, based at least in part on a result of the evaluating of the user audio profile; and repeating at least steps c, e, f and g using the remediated user audio profile until the phoneme error rate is reduced, wherein the remediated user audio profile is used by the speech recognition engine to process audio from the user.

2. The method of claim 1 wherein:

translating the known text of the matched audio and text pair into the at least one text phoneme sequence comprises translating the known text of the matched audio and text pair into a plurality of text phoneme sequences, the known text having a plurality of pronunciations associated therewith, and the plurality of text phoneme sequences comprising a plurality of second sequences of phonemes representing the plurality of pronunciations of the known text, comparing the audio phoneme sequence to the at least one text phoneme sequence comprises comparing the audio phoneme sequence to each of the plurality of text phoneme sequences, and evaluating the user audio profile comprises using one of the plurality of text phoneme sequences that most closely matches the audio phoneme sequence.

3. The method of claim 1 wherein evaluating the user audio profile comprises calculating an accuracy score and determining whether the accuracy exceeds an accuracy threshold.

4. The method of claim 3 wherein the accuracy score comprises an average phoneme accuracy.

5. The method of claim 3 wherein the accuracy score comprises a weighted average phoneme accuracy score.

6. The method of claim 3 wherein the accuracy score comprises a sum of individual phoneme accuracy scores that are above a threshold.

7. The method of claim 3 wherein the phoneme average accuracy is a total phoneme average accuracy.

8. The method of claim 3 wherein the phoneme average accuracy is an individual phoneme average accuracy.

9. The method of claim 1 wherein remediating the user audio profile comprises coaching the user to properly articulate at least one phoneme for speech recognition.

10. The method of claim 1 wherein remediating the user audio profile comprises training the user to properly position and use a microphone for speech recognition.

11. The method of claim 1 further comprising determining an expected cost of transcription using speech recognition with human correction and an expected cost of transcription using human transcription only.

12. The method of claim 11 further comprising transmitting speech to the speech recognition engine only when the expected cost of the transcription using speech recognition with human correction is less than the expected cost of the transcription using human transcription only.

13. A method of determining whether a user audio profile meets or exceeds an accuracy requirement for speech recognition comprising:

(a) providing a processor with a speech recognition engine and a user audio profile;

(b) receiving, at the processor, a matched audio and text pair, wherein the matched audio and text pair comprises audio and a known text, and wherein the known text is provided to a user and the audio corresponds to the known text being spoken by the user;

(c) generating, by the processor using the speech recognition engine with the user audio profile, an audio phoneme sequence from the audio of the matched audio and text pair received at the processor, wherein the audio phoneme sequence comprises a first sequence of phonemes corresponding to the audio of the known text being spoken by the user;

(d) translating, by the processor, the known text of the matched audio and text pair into at least one text phoneme sequence, wherein the known text has at least one pronunciation associated therewith, and wherein the at least one text phoneme sequence comprises at least one second sequence of phonemes representing the at least one pronunciation of the known text;

(e) determining, by the processor, an accuracy of the speech recognition engine with the user audio profile in generating the audio phoneme sequence by comparing the audio phoneme sequence to the at least one text phoneme sequence to generate a phoneme error rate, wherein determining the accuracy comprises determining whether each individual phoneme of the audio phoneme sequence matches each individual phoneme of the text phoneme sequence; and (f) at least one of training, generating, or a combination thereof, by the processor, at least one of the user audio profile based at least in part on the calculated accuracy; and (g) repeating steps c, e, f, and g using the trained user audio profile until the phoneme error rate is reduced, wherein the trained user audio profile is used by the speech recognition engine to process audio from the user.

14. The method of claim 13, wherein the calculated accuracy is an accuracy of the audio phoneme sequence for all phonemes.

15. The method of claim 13, wherein the calculated accuracy is a plurality of individual phoneme accuracy.

16. The method of claim 13, further comprising predicting, by the processor, a predicted recognition accuracy of the user audio file for performing speech recognition on an unknown audio segment.

17. The method of claim 16, wherein the predicted recognition accuracy is predicted based at least in part on the calculated accuracy of the speech recognition engine.

18. The method of claim 16, further comprising determining, by the processor, to perform a speech recognition on the unknown audio segment using the user audio file only if the predicted recognition accuracy is at or above a predetermined threshold.

19. The method of claim 16, further comprising estimating, by the processor, a total cost of performing speech recognition of the unknown audio segment based at least in part on the predicted recognition accuracy.

* * * * *